United States Patent [19]

Sera et al.

[11] 4,190,448
[45] Feb. 26, 1980

[54] DIFFUSION TRANSFER PHOTOGRAPHIC MATERIAL HAVING A CROSSLINKED CARBOXYLIC ACID POLYMER LAYER

[75] Inventors: Hidefumi Sera; Ikutaro Horie, both of Minami-ashigara, Japan

[73] Assignee: Fuji Photo Film Co., Ltd., Minami-ashigari, Japan

[21] Appl. No.: 948,726

[22] Filed: Oct. 5, 1978

[30] Foreign Application Priority Data

Oct. 5, 1977 [JP] Japan .................................. 52-119640

[51] Int. Cl.² .......................... G03C 1/40; G03C 1/48; G03C 5/54
[52] U.S. Cl. .................................................... 430/216
[58] Field of Search ............... 96/29 D, 77, 111, 76 R

[56] References Cited

U.S. PATENT DOCUMENTS 3,756,815  9/1973  Schlein et al. ......................... 96/77

OTHER PUBLICATIONS

"Neutralizing Materials in Photographic Elements", *Research Disclosure* #12331, 7/1974, pp. 22–24.

*Primary Examiner*—Richard L. Schilling
*Attorney, Agent, or Firm*—Sughrue, Rothwell, Mion, Zinn and Macpeak

[57] ABSTRACT

An element for a diffusion transfer photographic light-sensitive material comprising a synthetic resin film support having thereon an image-receiving layer, a light-sensitive silver halide emulsion layer and a layer of a carboxylic acid polymer wherein the carboxylic acid polymer is cross-linked with a polyhydric alcohol in the presence of a condensation-type cross-linking agent with the proviso that the layer of the carboxylic acid polymer is positioned other than between the image-receiving layer and the light-sensitive silver halide emulsion layer.

24 Claims, No Drawings

DIFFUSION TRANSFER PHOTOGRAPHIC MATERIAL HAVING A CROSSLINKED CARBOXYLIC ACID POLYMER LAYER

BACKGROUND OF THE INVENTION

1. Field of the Invention

The present invention relates to diffusion transfer photographic light-sensitive materials and, more particularly, to an element for a diffusion transfer photographic light-sensitive material having a carboxylic acid polymer layer with improved physical properties.

2. Description of the Prior Art

In a diffusion transfer photographic light-sensitive material, it is known the photographic image produced therein can be stabilized by incorporating a carboxylic acid polymer layer as a coated layer into the photographic material, neutralizing the alkali remaining in the system at the appropriate time after the effects of development and other processings have been completed, and extracting other salt-forming components with the carboxylic acid polymer layer to prevent their precipitation and deposition in the photographic material, as disclosed in U.S. Pat. Nos. 3,362,819 and 3,362,821.

The carboxylic acid polymer layer must contain acid groups in an amount sufficient to neutralize the alkali contained in the system after processing and return the system to neutrality. However, a carboxylic acid polymer layer which has acid groups in the salt form after the neutralization has a markedly increased hydrophilic property. Further, a carboxylic acid polymer layer with a high content of acid groups is hydrophilic as such and this layer swells markedly after the neutralization due to the increase in hydrophilic character, resulting in the occurrence of reticulation or a dissolution of the layer. Restricting the amount of the carboxyl groups present, mixing the carboxyl group containing polymer with other polymers or the introduction of a hydrophobic residue, for example, esterification of a part of the carboxyl groups, in order to reduce the hydrophilic property to below a certain level, results in disadvantages such as the carboxylic acid polymer layer thickness must be increased to incorporate a fixed amount of carboxylic acid groups per unit area, the capacity of neutralizing alkali is decreased, or an organic solvent must be used to dissolve the carboxylic acid polymer which requires facilities for preventing hazards such as explosions during production.

Attempts have been made to harden to polymer layer having a high content of carboxylic acid groups using a cross-linking agent, for example, a compound containing, in the same molecule, at least two functional groups selected from an aziridyl group, a glycidyl group and an epoxy group, e.g., as described in British Pat. No. 1,495,464, an alum such as chromium alum, potassium alum, etc., as described in C. E. K. Mees and T. H. James, *The Theory of the Photographic Process*, Third Edition, Macmillan, New York (1966), an isooxazolium salt in combination with gelatin as described in U.S. Pat. No. 3,619,236, a carbodiimide, a dihydroquinoline-N-carboxylic acid ester as described in U.S. Pat. No. 4,013,468, a bisisooxazolium as described in Belgian Pat. No. 697,493, etc.

These compounds, however, have various subsidiary disadvantages. For example, an alum, a carbodiimide and an aziridine derivative have a strong toxic action on the human body, an epoxy compound has an adverse effect on the photographic properties, and the preparation of an isooxazolium is so difficult that the compound is very expensive. More importantly, in addition to these disadvantages, it should be noted that it is difficult to obtain a sufficiently hardened carboxylic acid polymer layer by addition of such a cross-linking agent to a carboxylic acid polymer even when the amount of addition of the cross-linking agent is increased, and when these cross-linking compounds are used in a large amount, undersirable influences are observed such as reduced diffusion of dyes from the light-sensitive layer of a diffusion transfer photographic material, a change in sensitivity, the carboxylic acid polymer layer per se becomes brittle or colored, and the like.

SUMMARY OF THE INVENTION

Therefore, a first object of the present invention is to provide an element for a diffusion transfer photographic light-sensitive material containing a polymer layer having a sufficiently high content of carboxyl groups and a high neutralization capacity for an alkali.

A second object of the present invention is to provide an element for a diffusion transfer photographic light-sensitive material containing a carboxylic acid polymer layer having a sufficiently high mechanical strength after the layer has absorbed an alkali.

A third object of the present invention is to provide a method for hardening a polymer layer having a high content of carboxyl groups in order to obtain a sufficiently high mechanical strength of the layer.

These and other objects of the present invention will become apparent from the description given hereinafter.

These objects of the present invention are accomplished with an acid polymer having carboxyl groups (hereinafter referred to for brevity as a carboxylic acid polymer), in particular, a polymer having 3 millimol or more of carboxyl groups per gram of the polymer with a compound known as a condensation type cross-linking agent and a polyhydric alcohol having two or more hydroxy groups in the molecule thereof.

Accordingly, this invention provides an element for a diffusion transfer photographic light-sensitive material comprising a synthetic resin film support having thereon an image-receiving layer, a light sensitive silver halide emulsion layer and a layer of a carboxylic acid polymer wherein the carboxylic acid polymer is cross-linked with a polyhydric alcohol in the presence of a condensation-type cross-linking agent with the proviso that the layer of the carboxylic acid polymer is positioned other than between the image-receiving layer and the light-sensitive silver halide emulsion layer.

DETAILED DESCRIPTION OF THE INVENTION

The carboxylic acid polymer preferably used in the present invention can be selected from synthetic or natural polymers containing carboxyl groups in an amount of about 3 to 17 millimol per gram of the polymer. The carboxyl groups can be attached directly to the main chain of the polymer or to a branch chain thereof. Polymers containing 7 to 17 millimol of carboxyl groups per gram of the polymer are particularly advantageous in the present invention, since they can be dissolved in an aqueous solution for coating.

Further, when a polymer in which about 2 mol% to about 20 mol% of the carboxyl groups are neutralized as the salt form thereof is reacted with a condensation-type cross-linking agent and a polyhydric alcohol, the cross-linking reaction proceeds rapidly whereby preferred results can be obtained. In particular, polymers in which about 5 mol% to about 10 mol% of the carboxyl groups are neutralized as the salt form thereof are preferred.

Homopolymers or copolymers of vinyl monomers containing carboxyl groups are particularly useful in the present invention. Examples of vinyl monomers containing carboxyl groups which can be used in the present invention include acrylic acid, methacrylic acid, maleic anhydride (and derivatives thereof, such as maleic acid, the half-ester or the half-amide of maleic acid), cinnamic acid, crotonic acid, citraconic acid, p-carboxystyrene, vinyl α-carboxymethyl ether, and the like. These vinyl monomers described above can be copolymerized with additional monomers including ethylenically unsaturated monomers, such as ethylene, vinyl acetate, styrene, alkyl vinyl ethers, acrylic esters, methacrylic esters, acrylamide, methacrylamide, etc. These additional monomers can be present in the carboxylic acid polymer in an amount such that the carboxylic acid polymer contains about 3 millimol or more of carboxyl groups per gram of the polymer.

The carboxylic acid polymer used in the present invention must have a molecular weight sufficient to provide a strong film after the carboxylic acid polymer is cross-linked. The molecular weight range which is suitable depends upon the carboxylic acid polymer used, but a suitable molecular weight generally ranges from about 5,000 to 500,000, preferably 10,000 to 200,000. Carboxylic acid polymers which can be advantageously used in the present invention contain the following structural units:

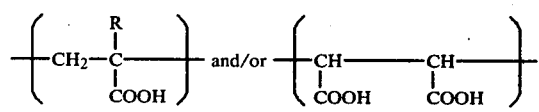

wherein R is a hydrogen atom or a methyl group.

Specific examples of the carboxylic acid polymers which can be advantageously used in the present invention are shown below in terms of the structural units thereof.

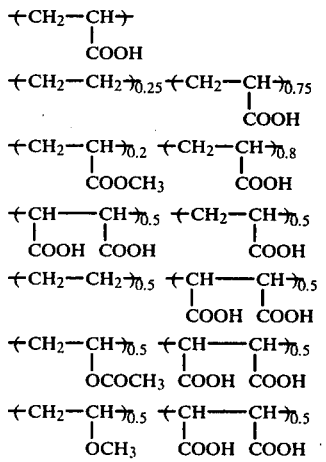

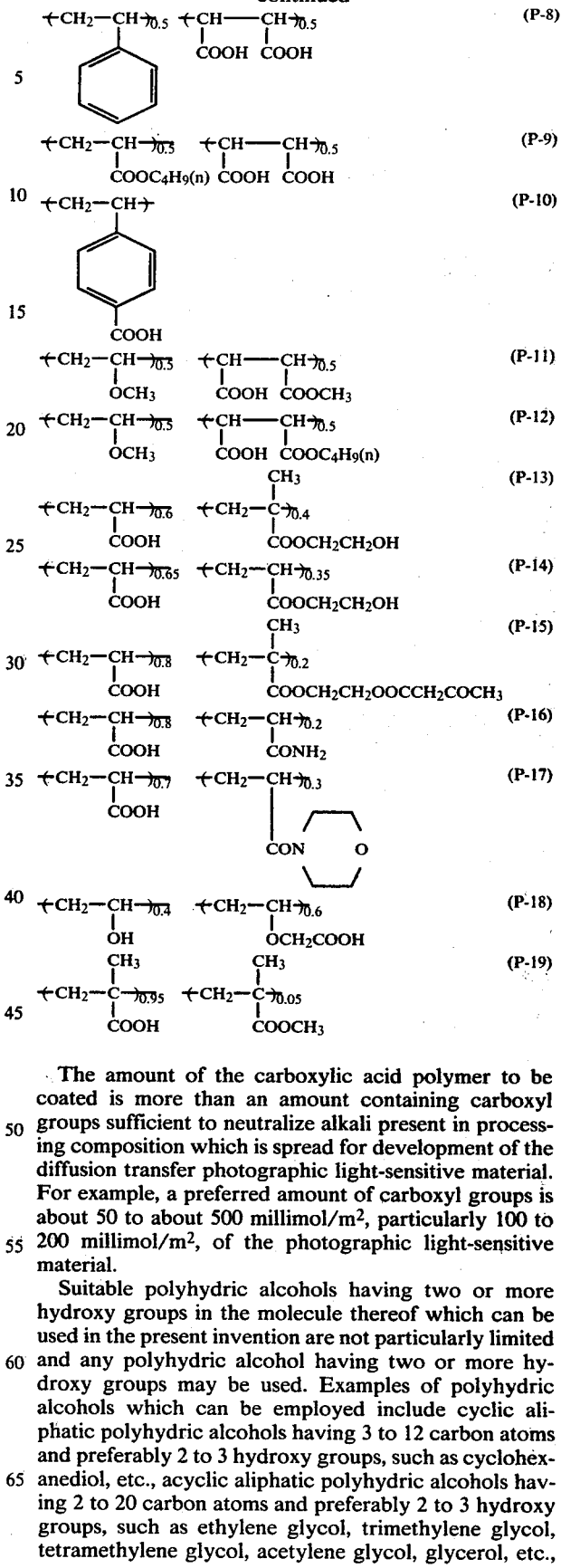

The amount of the carboxylic acid polymer to be coated is more than an amount containing carboxyl groups sufficient to neutralize alkali present in processing composition which is spread for development of the diffusion transfer photographic light-sensitive material. For example, a preferred amount of carboxyl groups is about 50 to about 500 millimol/m$^2$, particularly 100 to 200 millimol/m$^2$, of the photographic light-sensitive material.

Suitable polyhydric alcohols having two or more hydroxy groups in the molecule thereof which can be used in the present invention are not particularly limited and any polyhydric alcohol having two or more hydroxy groups may be used. Examples of polyhydric alcohols which can be employed include cyclic aliphatic polyhydric alcohols having 3 to 12 carbon atoms and preferably 2 to 3 hydroxy groups, such as cyclohexanediol, etc., acyclic aliphatic polyhydric alcohols having 2 to 20 carbon atoms and preferably 2 to 3 hydroxy groups, such as ethylene glycol, trimethylene glycol, tetramethylene glycol, acetylene glycol, glycerol, etc., alcohols containing one or more of an oxygen or nitrogen atom in the main chain thereof and having a total of 3 to 100 atoms in the main chain thereof, such as polyethylene glycol, diethanolamine, triethanolamine, etc., alcohols containing one or more aromatic groups having 6 to 16 carbon atoms, such as p-xylenediol, etc., high molecular weight polyols, such as polyvinyl alcohol, polyhydroxyethyl acrylate, etc.

Of these polyhydric alcohols, aliphatic dihydric alcohols, glycerol and polyethylene glycol are advantageously used. As aliphatic dihydric alcohols, aliphatic dihydric alcohols having 2 to 6 carbon atoms, such as ethylene glycol, and as the polyethylene glycol, a polyethylene glycol having a molecular weight of about 2,000 or less are particularly preferred.

The amount of the polyhydric alcohol used is about 5 to about 500 millimol, particularly 10 to 100 millimol, of hydroxy group per mol of carboxy group of the carboxylic acid polymer used.

Suitable condensation-type cross-linking agents which can be used in the present invention are agents which can promote the dehydration-condensation of one mol of carboxyl group and one mol of alcohol or amine. These agents are well known in a field of the synthesis of peptides and include, for example, N-ethyl-5-phenylisoxazolium-3'-sulfonate known as Woodward's Reagent K, N-tert-butyl-5-methyl-isoxazolium perchlorate known as Woodward's Reagent L, an isoxazolium salt as described in Japanese Patent Publication No. 30069/1969, U.S. Pat. Nos. 3,060,028, 3,316,095, 3,321,313 and 3,543,292, etc., N,N-dicyclohexylcarbodiimide (DCC), a water-soluble type carbodiimide such as 1-ethyl-3-(3-dimethylaminopropyl)carbodiimide hydrochloride, a carbodiimide as described in U.S. Pat. No. 3,619,236, Japanese Patent Publication No. 38715/1971, etc., a dihydroquinoline-N-carboxylic acid ester, a carbamoylpyridinium salt, a carbamoyloxypyridinium salt, and 6-chloro-1-p-chlorobenzene-sulfonyloxybenzotriazole, etc.

Of these cross-linking compounds, compounds represented by the following general formulae (I) to (III) can be particularly advantageously used in the present invention:

Compounds of the General Formula (I)

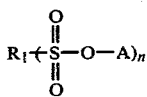
(I)

In the general formula (I), $R_1$ represents any group which is n-valent and, particularly, $R_1$ represents a hydrocarbon group having 1 to 10 carbon atoms or a substituted hydrocarbon group having 1 to 10 carbon atoms in the hydrocarbon moiety. The hydrocarbon group can be any of a straight chain, branched chain, cyclic, saturated or unsaturated hydrocarbon group and preferred examples include an alkyl group having 1 to 6 carbon atoms, such as a methyl group, an ethyl group, a propyl group, etc., an alkylene group having 1 to 6 carbon atoms, such as an ethylene group, a propylene group, etc., an aryl group, such as phenyl group, etc., an arylene group, such as phenylene group, etc., a vinyl group, etc.

Examples of substituents for $R_1$ include one or more alkoxy groups having 4 or less carbon atoms (such as methoxy or ethoxy, etc.), acyloxy groups having 7 or less carbon atoms (such as acetoxy), carboxylic acid amido groups having 7 or less carbon atoms, alkoxycarbonyl groups having 7 or less carbon atoms, halogen atoms (such as chlorine or bromine), quaternary ammonium groups, tertiary amino groups, and salts of tertiary amino groups, etc. Of these groups, alkoxy groups having 4 or less carbon atoms are particularly preferred.

A represents an atomic group bonded through an N-atom to the O atom and preferably represents a group represented by the following general formula (I'):

wherein $B_1$ and $B_2$ each represents a hydrogen atom, an alkyl group (preferably an alkyl group having 7 or less carbon atoms, such as a methyl group, an ethyl group, a propyl group, etc.) or an acyl group (preferably an acyl group having 7 or less carbon atoms, such as an acetyl group, a propionyl group, etc.), and at least one of $B_1$ and $B_2$ must be an acyl group. Also, $B_1$ and $B_2$ can bond to each other to form a 5- or 6-membered ring. Examples of suitable 5- or 6-membered rings include the following rings:

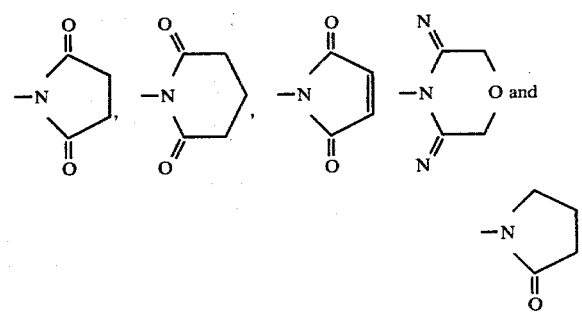

Further, these rings can also include a condensed ring, for example, those rings shown below are suitable:

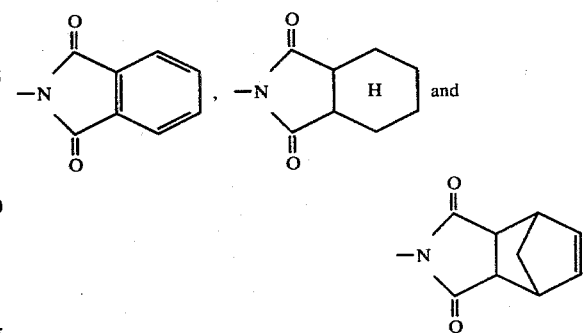

Further, n represents an integer of 1 to 4 and it is particularly preferred for n to be 1.

The compounds represented by the general formula (I) can be synthesized in a good yield using known processes. More specifically, they can be produced by reacting a corresponding n-valent sulfonic acid halide with a corresponding n-valent N-hydroxy compound in an organic solvent or an aqueous solution in the presence of an organic base, such as triethylamine, pyridine or 1,4-diazabicyclo(2,2,2)undecene, etc., or in the presence of an inorganic dehydrochlorinating agent, such as sodium carbonate or sodium hydroxide, etc.

Suitable n-valent sulfonic acid halides (mainly, sulfonyl chlorides) which can be used as starting materials are derived in most cases from the corresponding sulfonic acids or salts thereof. These n-valent sulfonic acids (or salts thereof) are generally well known compounds. Specific examples of monovalent sulfonic acids include methanesulfonic acid, ethanesulfonic acid, propanesulfonic acid, γ-chloropropanesulfonic acid, γ-methoxypropanesulfonic acid, γ-ethoxypropanesulfonic acid, β-methoxybutanesulfonic acid, β-carbamoylethanesulfonic acid, benzenesulfonic acid, p-chlorobenzenesulfonic acid, p-nitrobenzenesulfonic acid and m-carbamoylbenzenesulfonic acid. Examples of di- or tri-valent sulfonic acids are methionic acid, 1,2-ethanedisulfonic acid, 1,3-propanedisulfonic acid, 1,4-butanedisulfonic acid, 1,3-butanedisulfonic acid, 2-methylbutanedisulfonic acid and 3-oxa-1,5-pentanedisulfonic acid.

Specific examples of N-hydroxy compounds which can be used as the other starting material to produce the compounds of the formula (I) include N-hydroxysuccinimide, N-hydroxyglutarimide, N-hydroxymaleinimide, N-hydroxymethylsuccinimide, N-hydroxymethoxysuccinimide and N-hydroxydiglycolic imide, etc.

Compounds of the General Formula (II)

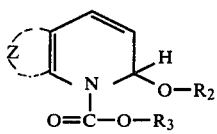

In the general formula (II), $R_2$ represents an aliphatic group, for example, an unsubstituted alkyl group (which can be a straight chain, branched chain or cyclic alkyl group and preferably is an alkyl group having 6 or less carbon atoms, such as methyl, ethyl, propyl, butyl, etc.) or a substituted alkyl group (e.g., an alkyl group substituted with, for example, one or more of an alkoxy group (for example, methoxy, ethoxy, etc.), an alkylamino group (for example, dimethylamino, etc.), a halogen atom (for example, chlorine, etc.), or an aryl group, etc.). In summary, $R_2$ can be any group which can be released from the quinoline nucleus of the general formula (II) as an anion of the formula $R_2$-O$^\ominus$.

$R_3$ represents an aliphatic group, for example, an unsubstituted alkyl group (which can be a straight chain, branched chain or cyclic alkyl group and preferably is an alkyl group having 6 or less carbon atoms, such as methyl, ethyl, propyl, butyl, etc.), a substituted alkyl group (e.g., an alkyl group substituted with, for example, one or more of an alkoxy group (for example, methoxy, ethoxy, etc.), an alkylamino group (for example, dimethylamino group, etc.), etc.), an aryl group, etc.), or an aryl group.

The carboxylic acid residue represented by $R_3$—O—CO— in the general formula (II) should be a group in which the electron density at the carbonyl carbon is lower than that of the carboxylic acid group of gelatin when the group forms a mixed acid anhydride together with a carboxylic acid group of gelatin.

Z represents an atomic group necessary to form a benzene ring (which can be substituted with one or more substituents, for example, an alkyl group (for example, methyl, ethyl, etc.) or a halogen atom (for example, bromine, etc.)).

Further, the aryl group (for example, a phenyl group) contained in $R_2$ or $R_3$ described above can be an aryl group substituted with one or more substituents which preferably do not have a reactive hydrogen atom. Suitable examples of substituents include, for example, a nitro group, a halogen atom (for example, chlorine, bromine, etc.), an alkoxy group (for example, methoxy, ethoxy, etc.), a dialkylamino group (for example, dimethylamino, etc.), and the like.

The compounds represented by the general formula (II) according to the present invention include commercially available compounds and, in general, can be easily synthesized. Also, harmful effects on the human body have not been reported for these compounds and they are extremely stable compounds and also are extremely stable in the form of a solution (for example, in methyl alcohol) thereof.

Compounds of the General Formula (III)

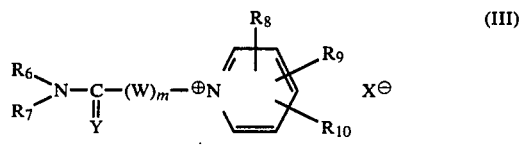

In the general formula (III), $R_6$ and $R_7$, which may be the same or different, each represents an alkyl group, an aryl group or an aralkyl group. These groups have preferably 1 to 7 carbon atoms. Also, $R_6$ and $R_7$ can combine to form a 5- or 6-membered ring in which the carbon atoms can be replaced by one or two hetero atoms (for example, N, O or S) other than the nitrogen atom to which $R_6$ and $R_7$ are bonded.

Y represents an oxygen atom or a sulfur atom and an oxygen atom is preferred for Y.

W represents an oxygen atom and m is 0 or 1.

$R_8$, $R_9$ and $R_{10}$, which may be the same or different, each represents a hydrogen atom or a substituent, for example, an alkyl group having 5 or less carbon atoms, an alkoxy group having 4 or less carbon atoms, an acylamido group having 4 or less carbon atoms, a carbamoyl group, etc., if desired.

$X^\ominus$ represents an acid anion of an organic acid or an inorganic acid, and preferably, is a halogen ion, such as a chlorine ion, etc., a sulfate ion, an organic sulfonate ion, etc.

Where the compound of the general formula (II) includes a sulfonate anion, $X^\ominus$ is not present.

The compounds in which W represents an oxygen atom can be synthesized according to the process as described in German Patent Application (OPI) No. 2,408,814 and those in which m is 0, i.e., W is not present, can be synthesized according to the process as described in German Patent Application (OLS) No. 2,408,813.

Specific examples of compounds represented by the general formulae (I) to (III) are described below. However, the present invention is not to be construed as being limited to these examples only.

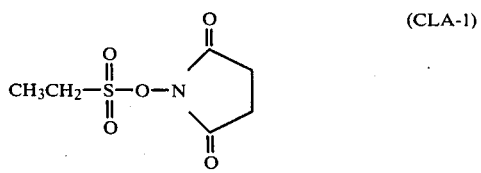

(CLA-1)

-continued
(CLA-2)
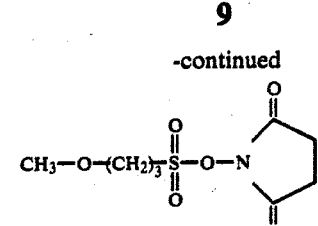
(CLA-3)
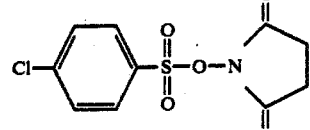
(CLA-4)
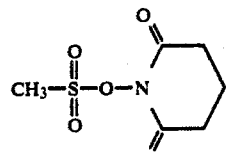
(CLA-5)
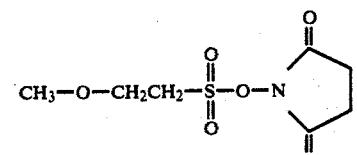
(CLA-6)
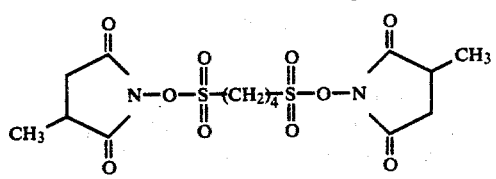
(CLA-7)
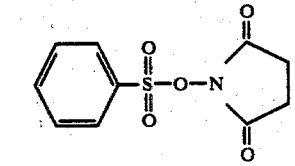
(CLA-8)
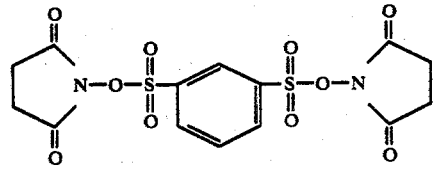
(CLA-9)
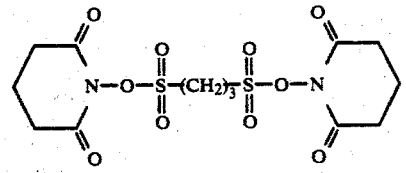
(CLA-10)
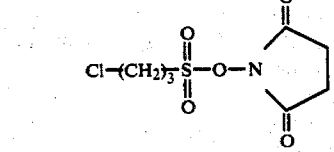
(CLA-11)
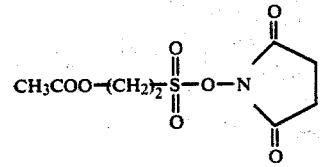
-continued
(CLA-12)
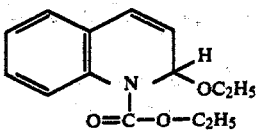
(CLA-13)
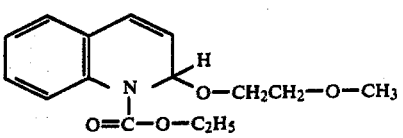
(CLA-14)
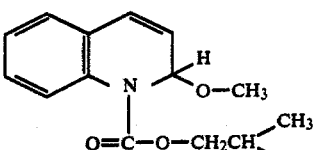
(CLA-15)
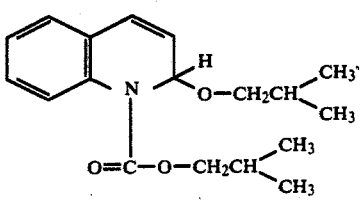
(CLA-16)
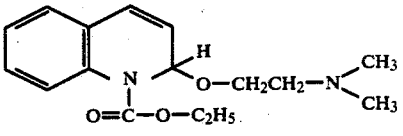
(CLA-17)
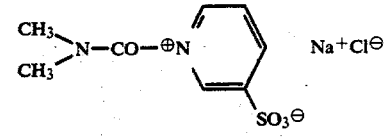
(CLA-18)
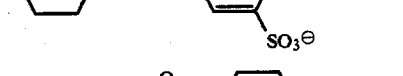
(CLA-19)
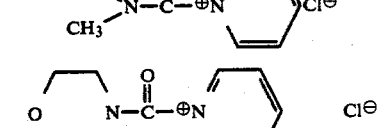
(CLA-20)
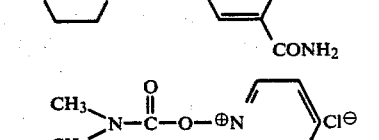
(CLA-21)
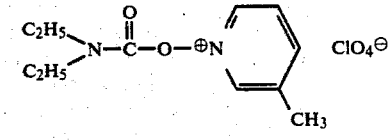
(CLA-22)
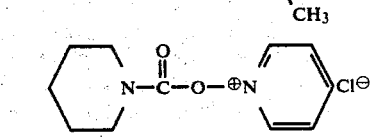
(CLA-23)

Also, cross-linking agents outside of the scope of the present invention but used for comparison in the Examples hereinafter described are set forth below.

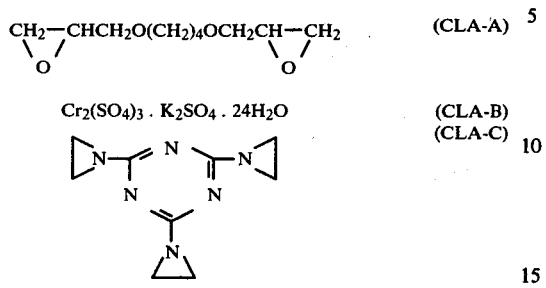

(CLA-A)

Cr$_2$(SO$_4$)$_3$ · K$_2$SO$_4$ · 24H$_2$O (CLA-B)

(CLA-C)

Some representative Synthesis Examples of condensation type cross-linking agents which can be used in the present invention are illustrated below. Unless otherwise indicated herein, all parts, percents, ratios and the like are by weight.

Synthesis Example 1

Synthesis of (CLA-1)

4.6 g of N-hydroxysuccinimide was dissolved in 80 ml of anhydrous acetone and a solution containing 5 g of ethane sulfonyl chloride in 20 ml of anhydrous acetone was added dropwise thereto with cooling. Further, a solution containing 4 g of triethylamine in 20 ml of acetone was added dropwise thereto at below 0° C. with stirring and the resulting mixture was stirred for 3 hours. After stirring at room temperature for an additional 2 hours, the mixture was filtered under suction and the filtrate was condensed under reduced pressure. 300 ml of ice water was added thereto to precipitate white crystals. After filtration and drying, 7.5 g of white needlelike crystals were obtained. Melting point: 140° C.

Elemental Analysis

|  | C | H | N |
|---|---|---|---|
| Calculated (%): | 34.78 | 4.35 | 6.76 |
| Found (%): | 34.56 | 4.42 | 6.77 |

Synthesis Example 2

Synthesis of (CLA-2)

White crystals were obtained by reacting N-hydroxysuccinimide with γ-methoxy propanesulfonyl chloride in the same manner as in Synthesis Example 1. Melting point: 75°–76° C.

Synthesis Example 3

Synthesis of (CLA-12)

130 g of quinoline was dissolved in 300 ml of benzene and 97 ml of ethyl chloroformate was added thereto with cooling. The solution was cooled to −5° C. and a solution containing 155 ml of triethylamine and 92 ml of ethyl alcohol was added dropwise thereto with stirring. After stirring for 1 hour, the mixture was washed with water and the aqueous layer was extracted with chloroform. The extract and the oil layer were condensed under reduced pressure. About 20 ml of diethyl ether was added to the residue to precipitate crystals which were collected by filtration. Yield: 165 g (66%). Melting point: 63.5° to 65° C.

Synthesis Example 4

Synthesis of (CLA-13)

Procedures were carried out in the same manner as described in Synthesis Example 3 using quinoline, ethyl chloroformate, triethylamine and ethylene glycol monomethyl ether. After the completion of the reaction, the mixture was washed with water and distilled under reduced pressure whereby a distillate having a boiling point of 160° to 162° C. at 0.6 mm Hg was collected. Yield: 56%.

Synthesis Example 5

Synthesis of (CLA-18)

By repeating the same procedures as described in U.S. Pat. No. 4,063,952, crystals having a melting point of 236° to 237° C. were obtained.

Synthesis Example 6

Synthesis of (CLA-21)

By repeating the same procedures as described in U.S. Pat. No. 4,055,427, a solid having a melting point of 162° to 166° C. (decomposed) was obtained.

A suitable amount of the condensation type cross-linking agent used in this invention is preferably about 0.5 to about 20 millimol, particularly 1 to 10 millimol, per mol of carboxyl group in the carboxylic acid polymer.

The cross-linking agent can be incorporated in the carboxylic acid polymer layer, or can be incorporated in a layer adjacent the carboxylic acid polymer layer (e.g., in a timing layer) and diffused to the carboxylic acid polymer layer.

Various arrangements of the carboxylic acid polymer layer can be used in the present invention. For example, the following arrangements are advantageous in the practice of the present invention:

(i) an arrangement in which a carboxylic acid polymer layer and an image-receiving layer are successively coated on a first support, a silver halide emulsion layer is coated on a second support, and a processing solution is spread in a layer form between the image-receiving layer and the silver halide emulsion layer;

(ii) an arrangement in which a carboxylic acid polymer layer and a silver halide emulsion layer are successively coated on a first support, an image-receiving layer is coated on a second support, and a processing solution is spread in a layer form between the image-receiving layer and the silver halide emulsion layer;

(iii) an arrangement in which a carboxylic acid polymer layer, an image-receiving layer (and, if desired, a stripping layer or a light-reflecting layer) and a silver halide emulsion layer are successively coated on a support, and a processing solution is supplied on the surface of the silver halide emulsion layer; and (iv) an arrangement in which a carboxylic acid polymer layer is coated on a first support, an image-receiving layer (and, if desired, a stripping layer or a light-reflecting layer) and a silver halide emulsion layer are coated on a second support, and a processing solution is spread in a layer form between the carboxylic acid polymer layer and the silver halide emulsion layer. In the above embodiments, the carboxylic acid polymer layer is, desirably, separated from the processing solution layer by a neutralization rate controlling layer (timing layer). This layer is capable of preventing an undesirable reduction in the photographic density which results from a premature decrease in the pH of the system due to the effect of the carboxylic acid polymer layer before the required steps for forming a photographic image such as the development of the silver halide emulsion layer and the formation of the diffusion transfer image are substantially completed, and is capable of retarding the decrease in the pH before the desired image formation is substantially completed.

Useful neutralization rate controlling layers include uniform polymer layers of gelatin, polyvinyl alcohol, polyvinyl propyl ether, polyacrylamide, hydroxypropylmethyl cellulose, isopropyl cellulose, partially butyralated polyvinyl alcohol, partially hydrolyzed polyvinyl acetate, copolymers of β-hydroxyethyl methacrylate, or the like, and a polymeric layer capable of increasing the processing temperature latitude, as disclosed in U.S. Pat. No. 3,455,686, as well as a mixed polymer layer of a continuous phase of a hydrophobic polymer and a discontinuous phase of a hydrophilic polymer as described in U.S. Pat. No. 3,785,815.

Supports which can be used in the present invention are substantially planar materials which do not undergo any marked dimensional changes due to the processing solution during the course of processing. Flexible supports are generally useful, although rigid supports, such as glass, can be used depending upon the purpose. Examples of suitable flexible supports are those which are generally used for photographic materials, e.g., cellulose nitrate, cellulose acetate, polyvinyl acetal, polystyrene, polycarbonate, polyethylene terephthalate, etc., and suitable supports include a transparent support, a colored support obtained by adding a dye to the support, a light-reflecting support obtained by adding a white pigment, such as titanium dioxide, to the support, or a light-shielding support obtained by adding a light absorbing substance, such as carbon black, to the support. In addition, paper supports, particularly, baryta-coated papers and papers the surface of which has been coated for waterproofing with, e.g., polyethylene, can be advantageously used depending upon the purpose. Supports which are oxygen impermeable, such as laminates in which a polyvinyl alcohol layer is sandwiched between polyethylene terephthalate layers, water vapor permeable supports as described in U.S. Pat. No. 3,573,044, and supports having a light-shielding back layer which is capable of being removed after processing as described in Japanese Patent Publication No. 4086/1972, and Japanese Patent Application (OPI) Nos. 10020/1974 and 10021/1974 (The term "OPI" as used herein refers to a "published unexamined Japanese patent application") can be used depending upon the purpose of the photographic material used.

The support can contain, if desired, a plasticizer, such as a phosphoric ester or a phthalic ester, an ultraviolet absorbing agent, such as 2-(2-hydroxy-4-tert-butyl-phenyl)benzotriazole, or an antioxidant, such as a hindered phenol. In order to improve the adhesion between a support and a photographic layer containing a hydrophilic colloid, it is advantageous to provide a subbing layer on the support or to subject the surface of the support to a pre-treatment using a corona discharge, an ultraviolet irradiation, a flame treatment, and the like.

The carboxylic acid polymer layer of the present invention can contain additional additives, e.g., a plasticizer such as triacetin; a developing agent scavenger as described in U.S. Pat. Nos. 3,725,063, 3,730,713 and 3,743,504; a development inhibitor, such as 1-phenyl-5-mercaptotetrazole; a surface active agent; a color fading preventing agent; a filter dye or pigment; a blocking preventing agent, such as colloidal silica; diatomaceous earth as described in U.S. Pat. No. 4,029,504, etc.

According to the present invention, a carboxylic acid polymer layer having a sufficiently high physical strength can be obtained by coating such a layer on a support or a photographic constituent layer, for example, as follows:

(1) A carboxylic acid polymer is dissolved in a solvent, such as water, methanol, ethanol, acetone or a mixture thereof in order to prepare a solution of the carboxylic acid polymer having a viscosity of about 100 to about 5,000 centipoise, preferably 500 to 2,000 centipoise, at room temperature (about 25° C.). 2 to 20 mol% of the carboxyl groups of carboxylic acid polymer can be neutralized with an alkali, such as potassium hydroxide, sodium hydroxide, etc., if desired.

(2) A polyhydric alcohol and a condensation type cross-linking agent are added to the polymer solution described above. If desired, a coating aid and a photographic additive (for example, an anti-fogging agent, a blocking preventing agent, etc.) are added thereto as well.

(3) The solution prepared in (2) above is coated on a support or on a photographic constituent layer using an immersion coating process, a bar coating process, an extrusion coating process, etc., and dried at a temperature of room temperature to about 150° C.

The carboxylic acid polymer layer of the present invention has a characteristic feature that it has a high carboxyl acid group content and has high water resistance. In general, a carboxylic acid polymer layer having a high carboxyl acid group content is naturally highly hydrophilic and is rendered more hydrophilic particularly when treated with an alkaline processing solution. Under such conditions, the carboxylic acid polymer layer swells markedly, so that the mechanical strength as a film is reduced, and, therefore, the layer tends to be destroyed. In the present invention, the carboxylic acid polymer is effectively cross-linked, with satisfactory mechanical strength being retained even after alkaline processing. That is, the present invention enables a carboxylic acid polymer having a high carboxyl acid group content as a photographic neutralizing layer to be used.

According to the present invention, particularly preferred results are obtained using the compound represented by the general formula (I).

The present invention makes it possible to use a carboxylic acid polymer having a high carboxyl group content. Many of the carboxylic acid polymers of the present invention can be dissolved in aqueous solvents. Various advantages are achieved by the use of aqueous solvents as a solvent for coating. For example, coating in which an organic solvent is used requires special production facilities for prevention of accidents. Use of an organic solvent in coating is also undesirable from the viewpoint of the safety to working personnel, their health and environmental protection. On the other hand, coating in which an aqueous solvent is used does not require these considerations and present equipment conventionally used in the preparation of photographic materials can be employed.

The carboxylic acid polymer layer of the present invention rapidly undergoes a cross-linking reaction after coating and constant properties are maintained. On the contrary, the cross-linking reaction in known carboxylic acid polymer layers proceeds only at a slow rate and continues to harden over a long period of time resulting in variable properties.

The carboxylic acid polymer layer of the present invention is water resistant, but also is hydrophilic, and, therefore, it uniformly interacts with the components of a processing solution and can effectively capture the components of the processing solution. Thus, excellent image stability, small photographic staining and good transparency of the layers can be achieved.

Image-receiving layers and silver halide emulsion layers which can be used in this invention are as described in U.S. Pat. No. 3,942,987, and Research Disclosure, No. 151, pp. 75–87.

This invention is further described in greater detail by reference to the following examples.

EXAMPLE 1

On a polyester support, the layers shown in Table 1 below were coated to prepare a cover sheet.

Table 1

Layer Structure and Composition of Cover Sheet

| | Sample | | | | |
|---|---|---|---|---|---|
| | A | B | C | D | E |
| Neutralizing Layer | (1)* | (1)* | (1)* | (1)* | (1)* |
| | CLA-A 10 millimol/ mol of COOH | CLA-1 10 millimol/ mol of COOH | CLA-1 5 millimol/ mol of COOH | CLA-1 1 millimol/ mol of COOH | CLA-1 0.1 millimol/ mol of COOH |
| Timing Layer | (2)** | (2)** | (2)** | (2)** | (2)** |

(1)* Polyacrylic acid (5 mol % of carboxyl groups neutralized with NaOH) 15 g/m² + glycerol 10 millimol/mol of COOH
(2)* Cellulose acetate (40% acetylated) 4.1 g/m² + Copolymer of styrene and malic anhydride 0.2 g/m². The Timing Layer was coated on the Neutralizing Layer.

Using the cover sheet thus-prepared, a light-sensitive element for the color diffusion transfer process as described in Table 2 below and a pod containing a spreadable processing solution as described in Table 3 below, a mono sheet type format, was prepared. After appropriate exposure to light, the format was developed by spreading the processing solution. The occurrence of reticulation in the cover sheet one day after the development is shown in Table 4.

Structure and Composition of Color Diffusion Transfer Light-Sensitive Element

| | |
|---|---|
| Protective Layer | Gelatin (0.6 g/m²) + Polybutyl methacrylate latex (1 g/m²) |
| Blue-Sensitive Layer | Blue-sensitized internal latent image type silver bromide emulsion (silver 1.2 g/m² + gelatin 1 g/m²) + Compound (A) (0.4 g/mol silver) + 2,5-Di-sec-dodecylhydroquinone (16 g/mol silver) |
| Yellow Color Former Layer | Compound (B) (0.9 g/m²) + Diethyllaurylamide (0.4 g/m²) + Gelatin (1 g/m²) |
| Intermediate Layer | Gelatin (1.5 g/m²) + 2,5-Di-sec-dodecylhydroquinone (1.1 g/m²) |
| Green-Sensitive Layer | Green-sensitized internal latent image type silver bromide emulsion (silver 1.2 g/m² + gelatin 1 g/m²) + Compound (A) (0.4 g/mol silver) + 2,5-Di-sec-dodecylhydroquinone (16 g/mol silver) |
| Magenta Color Former Layer | Compound (C) (0.6 g/m²) + Diethyllaurylamide (0.3 g/m²) + Gelatin (1 g/m²) |
| Intermediate Layer | Gelatin (1.5 g/m²) + 2,5-Di-sec-dodecylhydroquinone (1.1 g/m²) |
| Red-Sensitive Layer | Red-sensitized internal latent image type silver bromide emulsion (silver 1.2 g/m² + gelatin 1 g/m²) + Compound (A) (0.3 g/mol silver) + 2,5-Di-sec-dodecylhydroquinone (16 g/mol silver) |
| Cyan Color Former Layer | Compound (D) (0.6 g/m²) + Diethyllaurylamide (0.2 g/m²) + Gelatin (1 g/m²) |
| Light-Shielding Layer | Carbon black (2.5 g/m²) + Gelatin (3 g/m²) |
| White Reflective Layer | Titanium dioxide (20 g/m²) + Gelatin (2 g/m²) |
| Mordanting Layer | Poly(4-vinylpyridine) in which 25% of the nitrogen atoms in the pyridine rings is converted to the quaternary salt thereof with n-octylbromide (2.5 g/m²) + Gelatin (2.5 g/m²) |
| Support | Polyester support of a thickness of 150 microns |

Compound (A)

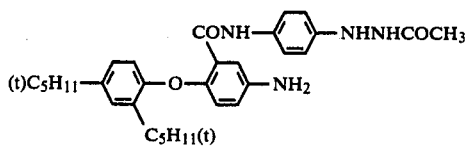

Compound (B)

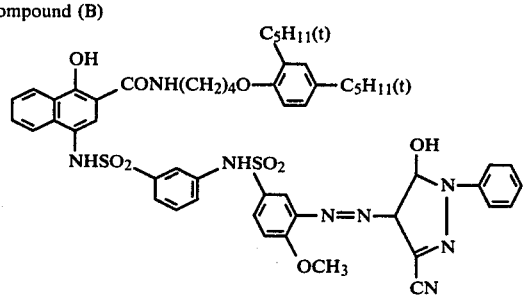

Compound (C)

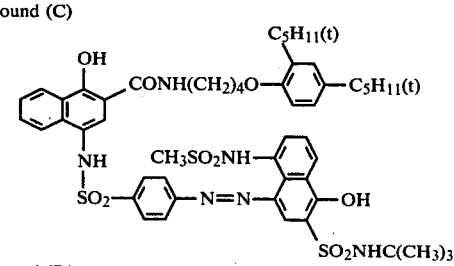

Compound (D)

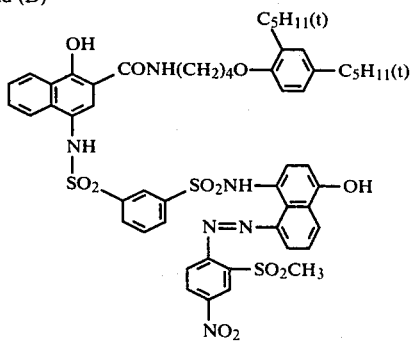

Table 3

| Composition of Spreadable Processing Solution | | |
| --- | --- | --- |
| Potassium Hydroxide | 50 | g |
| 4-Hydroxymethyl-4-methyl-1-phenyl-3-pyrazolidone | 12 | g |
| 5-Methylbenzotriazole | 3.8 | g |
| t-Butylhydroquinone | 0.4 | g |
| Sodium Hydrogen Sulfite | 1.0 | g |
| Carboxymethylcellulose | 44 | g |
| Carbon Black | 172 | g |
| Sodium Lauryl Sulfate | 10 | g |
| Water to make | 1 | l |

Table 4

| | Sample | | | | |
| --- | --- | --- | --- | --- | --- |
| | A | B | C | D | E |
| Reticulation | Fully occurred | Not occurred | Not occurred | Slightly occurred | Substantially occurred |

From the results shown in Table 4 above, it is apparent that the occurrence of reticulation after the spreading development processing is remarkably prevented when (CLA-1) is used together with the carboxylic acid polymer and the polyhydric alcohol.

EXAMPLE 2

A carboxylic acid polymer layer, a neutralization rate controlling layer and an image-receiving layer were coated in this order on a white baryta paper coated with polyethylene.

Table 5

| Composition of Sample | | | |
| --- | --- | --- | --- |
| | Sample | | |
| | F | G | H |
| Image-Receiving Layer | 1* | 1* | 1* |
| Neutralization Rate Controlling Layer | 2** | 2** | 2** |
| Carboxylic Acid Polymer Layer | 3*** | 3*** | 3*** |
| | 4**** | 4**** | 4**** |
| | CLA-6 | CLA-15 | CLA-C |
| | 3.5 millimol/ mol of COOH | 3.5 millimol/ mol of COOH | 3.5 millimol/ mol of COOH |

(1)*: Polyvinyl alcohol (saponification degree: 98 mol%; polymerization degree: 1,800)/Poly-4-vinylpyridine (2:1 weight ratio), Dry thickness: 7 microns
(2)**: 2-Hydroxyethylmethacrylate (average molecular weight: 350,000), Dry thickness: 8 microns
(3)***: Copolymer of vinyl methyl ether and maleic anhydride (1:1 molar ratio) (Gantrez AN-139, manufactured by GAF) hydrolyzed with an alkali to form a polymer containing 11.4 millimol/g of carboxyl groups (20 microns)
(4)****: 1,4-Butanediol (20 millimol/mol of COOH)

These Samples F, G and H were stored at 25° C., 60% RH for 3 days after coating and immersed in a 0.2 N aqueous NaOH solution at 25° C. and the time at which reticulation occurred was determined.

Table 6

| Time at which Reticulation Occurred in a 0.2N Aqueous NaOH Solution at 25° C. (RT, in seconds) | | | |
| --- | --- | --- | --- |
| | Sample | | |
| | F | G | H |
| RT | 500 | 450 | 45 |

From the results shown in Table 6 above, it is apparent that the occurrence of reticulation in an aqueous alkaline solution is remarkably prevented using (CLA-6) or (CLA-15) together with the carboxylic acid polymer and the polyhydric alcohol.

EXAMPLE 3

A carboxylic acid polymer layer having the composition shown in Table 7 below was coated on a polyester support. The samples thus-prepared were immersed in a 0.1 N aqueous NaOH solution at 25° C. and the time for melting out (MT) was determined. The results obtained are shown in Table 8 below.

From the results shown in Table 8, it is apparent that the melting out of the layer in a 0.1 N aqueous NaOH solution at 25° C. is markedly retarded using (CLA-2), (CLA-4), (CLA-12) or (CLA-18) as a cross-linking agent together with the carboxylic acid polymer and the polyhydric alcohol.

Table 7

| Composition of Carboxylic Acid Polymer Layer | | | | | | | | | | |
| --- | --- | --- | --- | --- | --- | --- | --- | --- | --- | --- |
| | Sample | | | | | | | | | |
| | I | J | K | L | M | N | O | P | Q | R |
| Carboxylic Acid Polymer | 1* | 1* | 1* | 1* | 1* | 1* | 1* | 1* | 1* | 1* |
| Polyhydric Alcohol | 2** | 2** | 2** | 2** | 2** | None | None | None | None | None |
| Cross-Linking Agent (millimol/ mol of COOH) | CLA-2 | CLA-4 | CLA-12 | CLA-18 | CLA-B | CLA-2 | CLA-4 | CLA-12 | CLA-18 | CLA-B |
| | 10 | 10 | 10 | 10 | 10 | 10 | 10 | 10 | 10 | 10 |

1* Copolymer of methacrylic acid and methyl methacrylate (95:5 by weight) (3 g/m$^2$)
2** Polyethylene glycol having average molecular weight of 400 (32 millimol/mol of COOH)

Table 8

Melting Out Time in a 0.1N Aqueous NaOH Solution at 25° C. (MT, in seconds)

| Sample | I | J | K | L | M | N | O | P | Q | R |
|---|---|---|---|---|---|---|---|---|---|---|
| MT | 1200 | 900 | 600 | 600 | 120 | 300 | 300 | 200 | 200 | 15 |

While the invention has been described in detail and with reference to specific embodiments thereof, it will be apparent to one skilled in the art that various changes and modifications can be made therein without departing from the spirit and scope thereof.

What is claimed is:

1. An element for a diffusion transfer photographic light-sensitive material comprising a synthetic resin film support having thereon an image-receiving layer, a light-sensitive silver halide emulsion layer and a layer of a carboxylic acid polymer wherein the carboxylic acid polymer is cross-linked with a polyhydric alcohol in the presence of a condensation-type cross-linking agent where the amount of said condensation type cross-linking agent is about 0.5 millimol or more per mol of carboxyl groups in the carboxylic acid polymer, with the proviso that the layer of the carboxylic acid polymer is positioned other than between the image-receiving layer and the light-sensitive silver halide emulsion layer.

2. The element for a diffusion transfer photographic light-sensitive material as claimed in claim 1, wherein said carboxylic acid polymer has more than about 3 millimol of carboxyl groups per gram of polymer.

3. The element for a diffusion transfer photographic light-sensitive material as claimed in claim 2, wherein said carboxylic acid polymer has more than 7 millimol of carboxyl groups per gram of polymer.

4. The element for a diffusion transfer photographic light-sensitive material as claimed in claim 1, wherein said carboxylic acid polymer contains the following structural units:

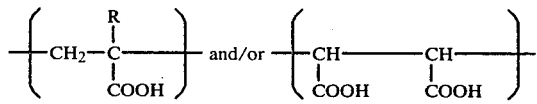

wherein R is aa hydrogen atom or a methyl group.

5. The element for a diffusion transfer photographic light-sensitive material as claimed in claim 1, wherein said condensation type cross-linking agent is represented by the following general formula (I):

wherein $R_1$ represents an n-valent hydrocarbon group; A represents an atomic group bonded through a nitrogen atom thereof to the oxygen atom; and n represents an integer of 1 to 4; the following general formula (II):

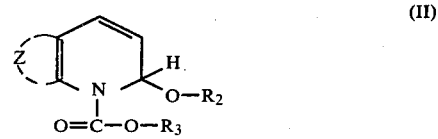

wherein $R_2$ represents a group releasable from the quinoline nucleus as an anion of the formula $R_2\text{-}O^-$; $R_3$ represents an aliphatic group or an aryl group; and Z represents the group of atoms necessary to form a benzene ring; or the following general formula (III):

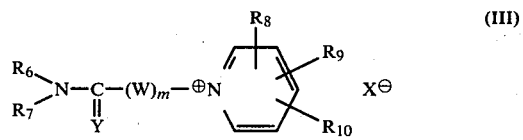

wherein $R_6$ and $R_7$, which may be the same or different; each represents an alkyl group, an aryl group or an aralkyl group or $R_6$ and $R_7$ can combine to form a 5- or 6-membered ring containing one or two hetero atoms in addition to the nitrogen atom to which $R_6$ and $R_7$ are attached; W represents an oxygen atom; Y represents an oxygen atom; m is 0 or 1; $R_8$, $R_9$ and $R_{10}$, which may be the same or different, each represents a hydrogen atom, an alkyl group having 5 or less carbon atoms, an alkoxy group having 4 or less carbon atoms, an acylamido group having 4 or less carbon atoms or a carbamoyl group; and $X^-$ represents an organic acid anion or an inorganic acid anion.

6. The element for the diffusion transfer photographic light-sensitive material as claimed in claim 5, wherein said condensation type cross-linking agent is a compound represented by the general formula (I) or (II).

7. The element for the diffusion transfer photographic light-sensitive material as claimed in claim 5, wherein said condensation type cross-linking agent is a compound represented by the general formula (I).

8. The element for the diffusion transfer photographic light-sensitive material as claimed in claim 1, wherein the amount of said condensation type cross-linking agent is 1 to 10 millimol per mol of carboxyl groups.

9. The element for the diffusion transfer photographic light-sensitive material as claimed in claim 1, wherein said polyhydric alcohol is an aliphatic polyhydric alcohol.

10. The element for the diffusion transfer photographic light-sensitive material as claimed in claim 1, wherein said polyhydric alcohol is an alcohol containing one or more of an oxygen or a nitrogen atom in the main chain thereof.

11. The element for the diffusion transfer photographic light-sensitive material as claimed in claim 9, wherein said polyhydric alcohol is an acyclic aliphatic polyhydric alcohol.

12. The element for the diffusion transfer photographic light-sensitive material as claimed in claim 10, wherein said polyhydric alcohol is a polyethylene glycol, diethanolamine or triethanolamine.

13. The element for the diffusion transfer photographic light-sensitive material as claimed in claim 1, wherein the amount of said polyhydric alcohol is about 5 to about 500 millimol per mol of carboxyl groups in the carboxylic acid polymer.

14. The element for the diffusion transfer photographic light-sensitive material as claimed in claim 13 wherein the amount of the polyhydric alcohol is 100 to 200 millimol per mol of carboxyl groups.

15. The element for the diffusion transfer photographic light-sensitive material as claimed in claim 1, wherein said carboxylic acid polymer is cross-linked with a polyhydric alcohol in the presence of a condensation-type cross-linking agent by adding said cross-linking agent to a mixture of the carboxylic acid polymer and the polyhydric alcohol.

16. The element for the diffusion transfer photographic light-sensitive material as claimed in claim 1, wherein said carboxylic acid polymer layer is a neutralizing layer of a color diffusion transfer photographic light-sensitive material.

17. The element for the diffusion transfer photographic light-sensitive material as claimed in claim 1, wherein about 2 to 20 mol% of the carboxyl groups of said carboxylic acid polymer are neutralized with an alkali.

18. The element for the diffusion transfer photographic light-sensitive material as claimed in claim 17, wherein 5 to 10 mol% of the carboxyl groups of said carboxylic acid polymer are neutralized.

19. The element for the diffusion transfer photographic light-sensitive material as claimed in claim 1, wherein said diffusion transfer photographic light-sensitive material comprises a first synthetic resin film support having thereon in order said layer of said carboxylic acid polymer and said image-receiving layer and a second synthetic resin film support having thereon said light-sensitive silver halide emulsion layer, said diffusion transfer photographic light-sensitive material being capable of having a processing solution spread in a layer form between said image-receiving layer and said silver halide emulsion layer.

20. The element for the diffusion transfer photographic light-sensitive material as claimed in claim 1, wherein said diffusion transfer photographic light-sensitive material comprises a first synthetic resin film support having thereon in order said layer of said carboxylic acid polymer and said silver halide emulsion layer and a second synthetic resin film support having thereon said image-receiving layer, said diffusion transfer photographic light-sensitive material being capable of having a processing solution spread in a layer form between said image-receiving layer and said silver halide emulsion layer.

21. The element for the diffusion transfer photographic light-sensitive material as claimed in claim 1, wherein said diffusion transfer photographic light-sensitive material comprises a synthetic resin film support having thereon in order said layer of said carboxylic acid polymer, said image-receiving layer and said silver halide emulsion layer, wherein said diffusion transfer photographic light-sensitive material is capable of having a processing solution spread on the surface of said silver halide emulsion layer.

22. The element for the diffusion transfer photographic light-sensitive material as claimed in claim 21, wherein said diffusion transfer photographic light-sensitive material additionally contains at least one of a stripping layer or a light-reflecting layer between said image-receiving layer and said silver halide emulsion layer.

23. The element for the diffusion transfer photographic light-sensitive material as claimed in claim 1, wherein said diffusion transfer photographic light-sensitive material comprises a first synthetic resin film support having thereon said layer of said carboxylic acid polymer and a second synthetic resin film support having thereon in order said image-receiving layer and said silver halide emulsion layer, said diffusion transfer photographic light-sensitive material being capable of having a processing solution spread in a layer form between said layer of said carboxylic acid polymer and said silver halide emulsion layer.

24. The element for the diffusion transfer photographic light-sensitive material as claimed in claim 23, wherein said diffusion transfer photographic light-sensitive material additionally includes at least one of a stripping layer or a light-reflecting layer between said image-receiving layer and said silver halide emulsion layer.

* * * * *